US005490757A

United States Patent [19]

Stratman

[11] Patent Number: 5,490,757

[45] Date of Patent: Feb. 13, 1996

[54] LIFTING APPARATUS

[76] Inventor: Daniel Stratman, 1812 Park Ave., Alton, Ill. 62002

[21] Appl. No.: 41,934

[22] Filed: Apr. 2, 1993

[51] Int. Cl.[6] .................. B66C 1/00

[52] U.S. Cl. .................. 414/680; 254/131; 414/917

[58] Field of Search .................. 414/684.3, 917, 414/685, 680, 589; 254/131

[56] References Cited

U.S. PATENT DOCUMENTS

| | | | |
|---|---|---|---|
| Re. 30,533 | 3/1981 | Dushku | 254/131 X |
| 192,554 | 6/1877 | Winters . | |
| 502,397 | 8/1893 | Lemons . | |
| 833,331 | 10/1906 | Michaelis . | |
| 891,988 | 6/1908 | Hardy . | |
| 1,093,405 | 4/1914 | Hallen . | |
| 1,129,494 | 2/1915 | Kelleher . | |
| 1,176,513 | 3/1916 | Bell . | |
| 4,902,191 | 2/1990 | Cumbest et al. | 414/685 X |
| 5,261,643 | 11/1993 | Wurdack | 254/106 |

*Primary Examiner*—Donald W. Underwood
*Attorney, Agent, or Firm*—Heller & Kepler

[57] ABSTRACT

A lifting apparatus preferably for applications in which a floor covering is to be removed and/or installed, has a lever arm and support that provide portions of two interconnected linkages. An interchangeable bracket is raised and lowered by the lifting apparatus. The bracket is provided with portions that insert into a partition member to raise the partition when the bracket is raised by the lifting apparatus.

21 Claims, 4 Drawing Sheets

LIFTING APPARATUS

BACKGROUND OF THE INVENTION

The present invention relates in general to lifting apparatus and pertains, more particularly to a vertical support and foot supporting a linkage that provides leverage to lift a furniture system, e.g., modular office system that could include walls and furniture. The lifting apparatus of this invention provides an improvement over the conventional crowbar-like equipment used to raise office partitions.

With the conventional crowbar-like tool it is generally necessary to continually lift and then lower and then move the bar and lift again when installing carpeting either by the yard or in tiles. The same drawback occurs when removing carpeting, tile, or other type or styles of flooring. As the size of the project increases a drawback associated with conventional methods and devices occurs due to the time it takes to complete the project.

Since existing methods and tools for installing flooring generally require the removal of a substantial amount of furniture, a business may have to either shut down during the project or pay to have the furniture, partitions, file cabinets and the like moved twice, once to clear an area for removal and replacing and again to replace the furniture. Another drawback that occurs relates to the additional costs that are not related to the actual flooring project.

Known devices include a moveable fulcrum pin for adjusting the height of a lever supported by a stand or an upright frame supported on a base block, or a base member with outwardly extending wings, or a plurality of vertical standards supported by a base member. Prior devices are used in automobile jacks, window lifting devices, and lifting devices in general. The existing jacks and jacking devices also have a drawback in that they provide a jack that is not particularly suited or adaptable to uses other than those for which the jack is intended.

SUMMARY OF THE INVENTION

Accordingly, it is an object of the present invention to provide a lifting apparatus that is more than simply a jack. With the lifting apparatus of this invention it is possible to install flooring at a rate substantially greatly than that previously possible.

Another object of the present invention is to provide a lifting apparatus that is constructed to provide a uniform and repeatable process during flooring installation and thus to provide an expedient that promotes an efficient use of time and labor.

A further object of the present invention is to provide a lifting apparatus that is adapted for the lifting of modular partitions of any design to thereby provide a substantially universally useable lifting apparatus.

Still another object of the present invention is to provide a lifting apparatus that may be readily used with different furniture arrangements. The lifting apparatus of this invention is preferably provided with a plurality of interchangeable brackets that by simply changing as required will allow use of the lifting apparatus on different styles of office furnishings.

Still a further object of the present invention is to provide a lifting apparatus that is adapted for use to lift and hold a furniture member, particularly a partition member, while flooring is being both removed and installed. The lifting apparatus of this invention is characterized by lifting the furnishing from an offset position so as to allow either removal or replacement of flooring directly underneath the lifted section of the office furnishings.

Another object of the present invention is to provide a lifting apparatus that can be taken to any location along with the appropriate brackets and used as disclosed in the following specification.

To accomplish the foregoing and other objects of this invention there is provided a vertical support and foot supporting a linkage that provides leverage to lift a furniture system, e.g., modular office system that could include walls and furniture. The linkage can be locked in a position with the furniture in a raised position. The bracket is received by complementary openings in the furniture system. The bracket can be changed to allow use of the lifting apparatus with different furniture systems.

In operation, the lifting apparatus is used to lift the furniture in order to replace the carpet with carpet tiles. The off-set of the foot allows the carpet directly beneath the furniture to be replaced without interference from the lifting apparatus. The lifting apparatus is used repeatedly to lift the furniture and replace the carpet until the entire carpet is replace with carpet tiles.

The lifting apparatus comprises means for supporting a lifting apparatus at a distance from a work area so as to provide access to a portion of a floor to be covered or uncovered. A lever arrangement provides an advantage to raised and lower the furnishing in the work area. The lever arrangement is part of two linkage assemblies that cooperate to raise the furnishing up and down in a substantially vertical path. An engaging means is provided with engaging portions that are complementary to the furnishing's receiving portions.

The lifting apparatus has means for controlling the height of the engaging means and maintaining the engaging means at a desired position above the work area.

The lifting apparatus of the present invention is preferably adapted for the use of interchangeable brackets. The brackets are removed and replaced as required to provide complementary extensions depending upon the style of furnishing.

In the disclosed embodiment described herein, there is provided a lifting apparatus that comprises two interrelated four bar linkage arrangements. A release mechanism is carried by a lever member which is part of both of the linkages. Also, in the preferred embodiment the engaging brackets are provided for raising and lowering furnishings that consist of partitions used, for example, in modular office arrangements.

The receiving openings into which the engaging bracket fits are provided by the manufacturer of the partition. The openings are typically used to connect adjacent panels when the partitions are installed, moved, or replaced.

These and other objects and features of the present invention will be better understood and appreciated from the following detailed description of one embodiment thereof, selected for purposes of illustration and shown in the accompanying drawings.

DETAILED DESCRIPTION

Figure 1:
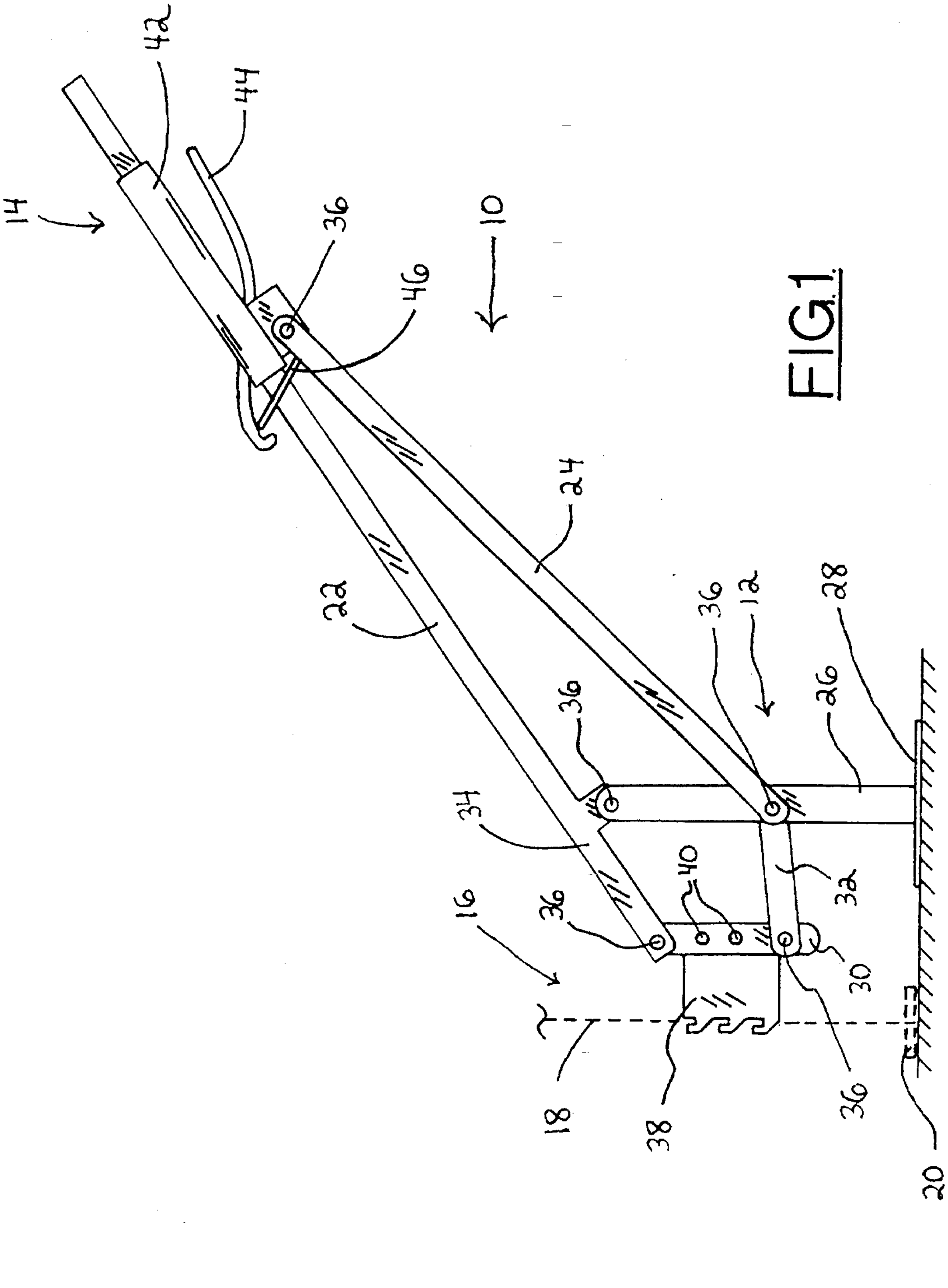
FIG. 1 is a side elevation view of a lifting apparatus constructed in accordance with the present invention shown in a lowered position and a lifting bracket engaging a furnishing member which is shown schematically.

Referring now to the drawings there is shown a preferred embodiment for the lifting apparatus of this invention. The lifting apparatus is described in connection with an office application to raise and lower office partitions.

The lifting apparatus of the present invention is particularly adapted for providing for the raising and lowering of furnishings, e.g., office partitions, during removal and installation of floor covering and is characterized by an offset support that removes the lifting apparatus from the work area while a locking mechanism holds the partition in place while engaged by a bracket member having an extension or extensions complementary with the partition connection openings used to raise the partition.

Figure 2:
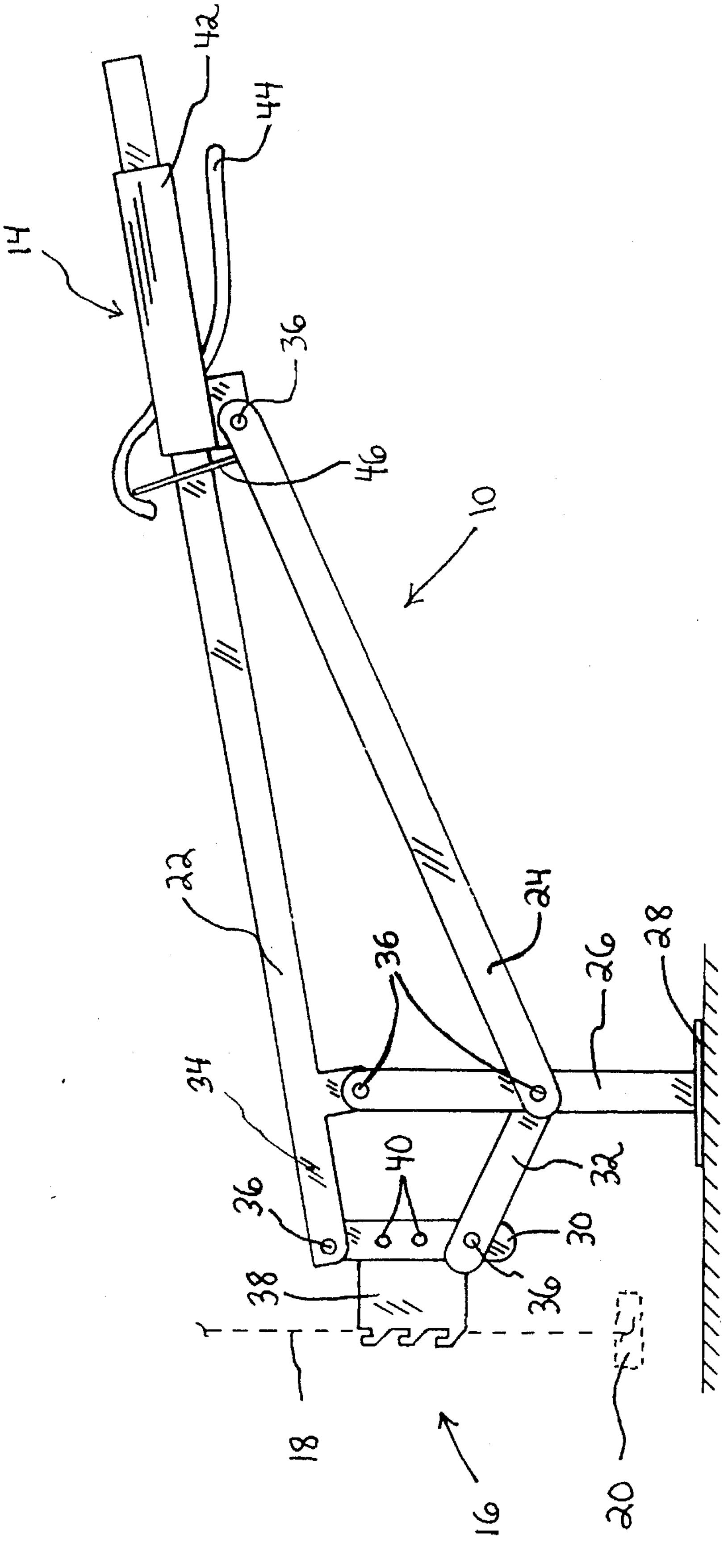
FIG. 2 is another side view of the lifting apparatus depicted in FIG. 1 and shown in a raised position and the lifting bracket engaging the furnishing member.
Figure 3:
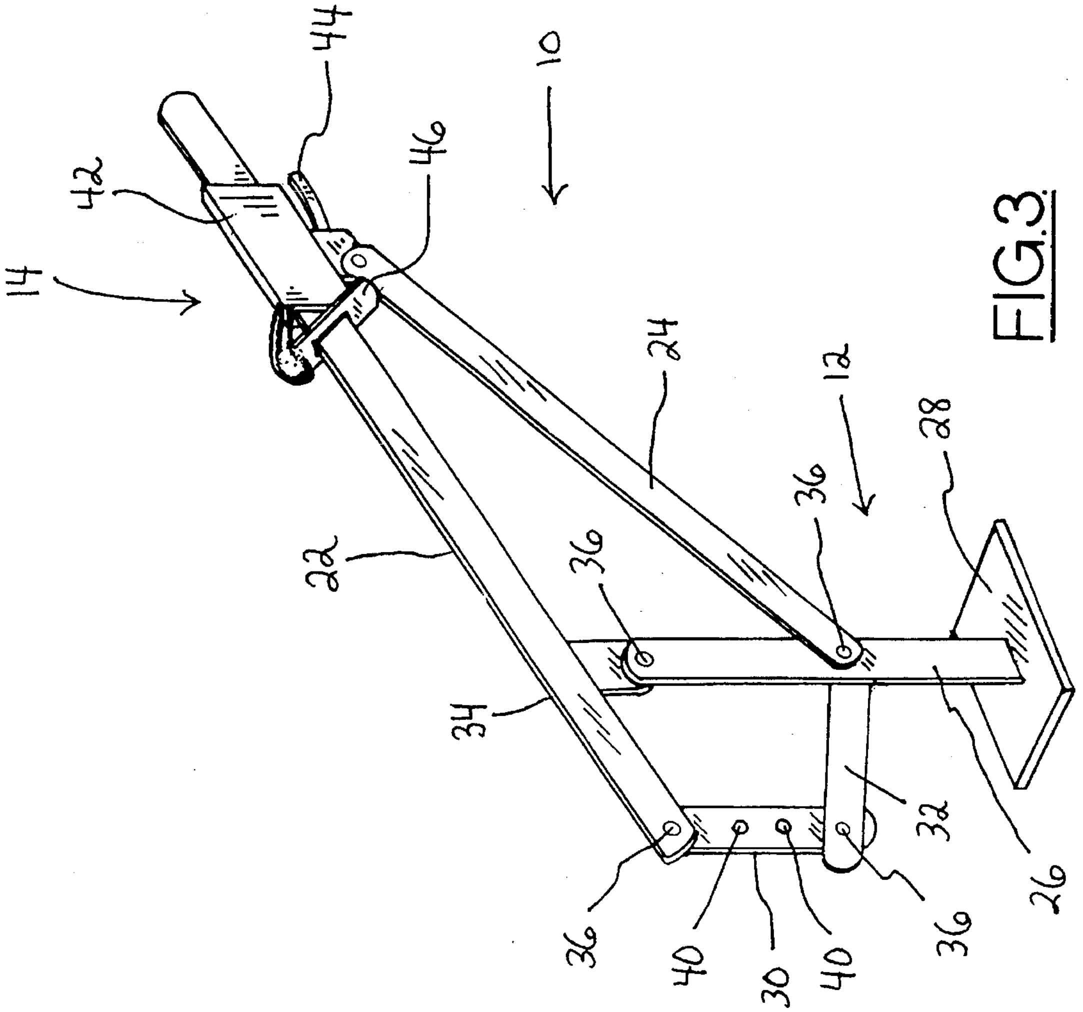
FIG. 3 is a perspective view of the lifting apparatus depicted in the drawings shown with the lifting bracket removed.
Figure 5:
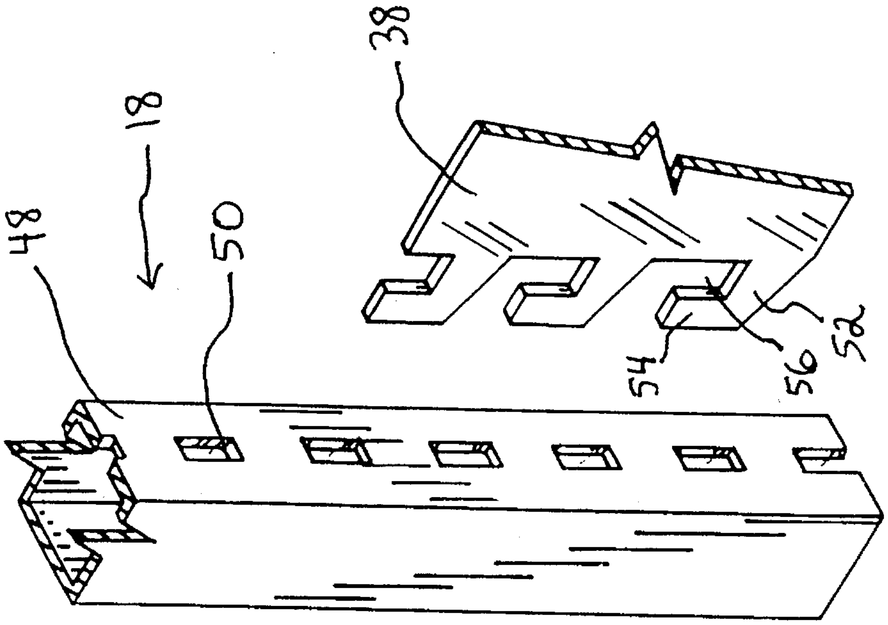
FIG. 5 is another partial perspective view of the lifting bracket and receiving portion of a partition embodiment without the decorative cover.
Figure 4:
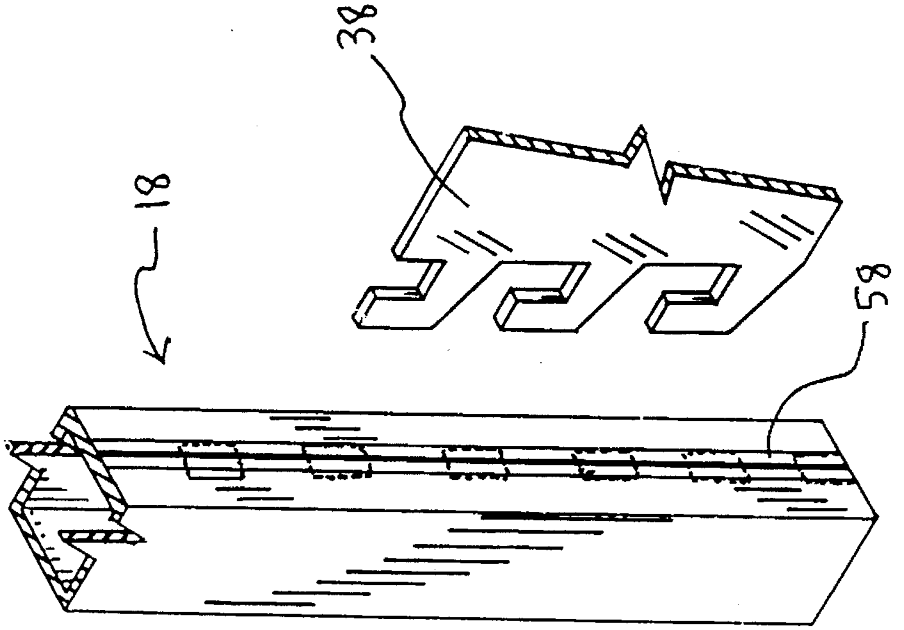
FIG. 4 is a partial perspective view depicting a lifting bracket and a receiving portion of an office partition covered by a decorative cover.

The drawings show the lifting apparatus 10 supported on a combination foot and pedestal support 12. The lifting apparatus is maintained in its desired position by a slide and lock mechanism 14. A lifting bracket assembly 16 is used to raise and lower a partition 18 which is illustrated schematically in FIGS. 1 and 2. The partition 18 is typically provided with a foundation of a supporting foot 20 or feet placed at regular intervals along the length of the partition and at the ends and at corners.

The lifting apparatus 10 includes a lever arm 22 that is used to leverage the weight of the partition into a raised position or lower the weight of the partition back towards the floor. The lever arm is generally in an upper position and the lever arm and works in association with a control arm 24 to control the position of the upper lever arm 22.

The support 12 provides a stationary generally vertical link member 26 supported by a support foot 28. This stationary link member is an integral part of both of two interconnected four bar linkages, one that controls the height of the lifting apparatus and the other that raises the partition 18 as a link member 30 is moved vertically up and down parallel to the stationary link member 26. A relatively lower link member 32 and a portion 34 of the upper link member 22 provide the other two members of the four bar linkage. Pivot connections 36 are provided as required.

A lifting bracket 38 is carried by the vertically moving member 30. The lifting bracket is attached for removal and replacement with any other interchangeable bracket. Attachment connections are represented and identified with reference characters 40.

One feature of the lifting apparatus 10 is that it locks in the desired position. A sliding handle assembly 42 slides back and forth on the upper link member 22. A release lever 44 is provided that is biased in an appropriate manner (not shown) so as to hold the sliding assembly and therefore the lifting bracket and anything being lifted at a desired height. In a preferred embodiment the handle is squeezed against the bias to release the sliding assembly and move the member 22 relative to the sliding assembly 42.

In the preferred embodiment illustrated in the drawings another locking feature is provided. A locking plate 46 fits over the member 22 and operates by means of its wobble. If perpendicular to member 22, then plate 46 allows sliding assembly 42 to slide relative to the member 22. Plate 46 wobbles on the member 22. At an angle to member 22 the plate holds the sliding assembly 42. A finger extended from the assembly restrains the plate in proximity to the sliding assembly, while allowing for the wobble effect.

In operation, in connection with the partition raising and lowering application previously mentioned to allow the removal or the installation of flooring, the partition 18 typically includes a support member 48 having one or more connection openings 50 for connecting adjacent partitions. Typically, not all of the connections are used unless four partitions (in the case of a square tube support) are connected ninety degrees apart. This leaves one or more groups of connections to be used in concert with the present invention.

A lifting bracket 52 includes one or more upward directed bracket extensions 54 whose end fits into the complementary connection opening 50. A slot 56 is defined between the extension 54 and the body of the lifting bracket 52.

The lifting apparatus is located and the bracket is inserted into the complementary connection. Squeezing the handle and, if provided, moving plate 46 to an appropriate position allows the handle to be pushed down, and through the cooperative movement of the interconnected linkages allows the upper member 22 to leverage the partition into a raised position. Releasing the handle and placing the plate at an angle locks the lifting apparatus and the partition in its raised position.

The existing flooring is removed (if present) and new flooring is installed. The removal and installation is accomplished without disconnecting and removing the partition. The locking mechanism is released and the partition lowered. The bracket is removed and the lifting apparatus is moved to the next work area. As each new work area is ready the lifting apparatus is moved and connected to the adjacent partition or other furnishing and raised.

From the foregoing description those skilled in the art will appreciate that all of the objects of the present invention are realized. The lifting apparatus allows the lifting of sections of partitions, for example, which it will be recognized will increase the rate at which the flooring removal and/or installation can be accomplished since the furnishings effectively remain in place during the work. The resulting time and labor savings promotes an efficient use of time and labor.

As the brackets can be changed, the lifting apparatus is adaptable for lifting furnishings of practically any design once a bracket with complementary extensions is designed. The offset support 28 effectively moves the lifting apparatus out of the work area and out of the way of the work to be done. The lifting apparatus is portable and, with a variety of brackets, can be taken to any location along with the appropriate brackets and used as disclosed in the foregoing specification and illustrated in the accompanying drawings.

While specific embodiments have been shown and described, many variations are possible. The particular shape of the members and the lifting brackets including all dimensions may be changed as desired to suit the furnishings and the work space or area with which it is used.

The configuration and dimensions of the lifting bracket with its extensions and slots may vary although a preferred embodiment is depicted for use with a typical partition. In another version of the partition a decorative flexible closure 58 is included. The flexible or other decorative closures will not impede the insertion of the bracket extensions as previously described.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A lifting apparatus for raising furnishings during removal and installation of floor covering, comprising:

means for supporting a lifting apparatus at a distance from a work area;

means for leveraging an item to be raised and lowered, the leveraging means supported for pivoting movement by a portion of the supporting means, and the portion of the supporting means providing pivoting support of the leveraging means providing a fulcrum for the leveraging means;

a four bar linkage assembly, the linkage assembly formed by the leveraging means and the supporting means, a vertical link member and a lower link member, the vertical link of the four bar linkage assembly moving in a substantially vertical path;

means for engaging a portion of the furnishing to be raised, the engaging means carried by the link moving in the substantially vertical path; and means for controlling the position of the leveraging means comprising a combination sliding member sliding relative to the leveraging means and a control arm, the sliding means and control arm providing a complementary four bar linkage in which the supporting means forms a stationary link of the linkage, and the leveraging means forms a link of the linkage, the controlling means further including engagable locking means which when engaged prevents movement of the leveraging means, thereby maintaining the engaging means in a desired position.

2. A lifting apparatus as set forth in claim 1 wherein the means for supporting the lifting apparatus is a generally vertical member supported on a supporting foot member.

3. A lifting apparatus as set forth in claim 1 wherein the means for engaging a portion of the furnishing includes a member capable of engaging the furnishing to be raised.

4. A lifting apparatus as set forth in claim 1 wherein the engaging means is a bracket having a plurality of extensions for insertion into complementary openings in the furnishing member.

5. A lifting apparatus as set forth in claim 1 wherein the engaging means is removable, whereby a plurality of different engaging means can be supported by the lifting apparatus for raising and lowering furnishings having a variety of complementary openings for receiving the engaging means.

6. A lifting apparatus for raising furnishings during removal and installation of floor covering, comprising:

means for supporting a lifting apparatus at a distance from a work area, the means for supporting the lifting apparatus including a generally vertical member supported on a supporting foot member;

means for leveraging an item to be raised and lowered, the leveraging means supported for pivoting movement by a portion of the supporting means, and the portion of the supporting means providing pivoting support of the leveraging means providing a fulcrum for the leveraging means;

a four bar linkage assembly, the linkage assembly formed by the leveraging means and the supporting means, a vertical link member and a lower link member, the vertical link of the four bar linkage assembly moving in a substantially vertical path;

means for engaging a portion of the furnishing to be raised, the engaging means carried by the link moving in the substantially vertical path, the means for engaging a portion includes a member capable of engaging the furnishing to be raised; and means for controlling the position of the leveraging means comprising a combination sliding member sliding relative to the leveraging means and a control arm, the sliding means and control arm providing a complementary four bar linkage in which the supporting means forms a stationary link of the linkage, and the leveraging means forms a link of the linkage.

7. A lifting apparatus as set forth in claim 6 wherein the engaging means is a bracket having a plurality of extensions for insertion into complementary openings in the furnishing member.

8. A lifting apparatus as set forth in claim 6 wherein the engaging means is removable, whereby a plurality of different engaging means can be supported by the lifting apparatus for raising and lowering furnishings having a variety of complementary openings for receiving the engaging means.

9. A lifting apparatus as set forth in claim 6 wherein the supporting means provides a stationary link in each linkage arrangement.

10. A lifting apparatus as set forth in claim 6 wherein the controlling means includes a bias member for releasing and restraining the controlling means.

11. A lifting apparatus for raising furnishings during removal and installation of floor covering, comprising:

means for supporting a lifting apparatus at a distance from a work area, the means for supporting the lifting apparatus including a generally vertical member supported on a supporting foot member;

means for leveraging an item to be raised and lowered, the leveraging means supported for pivoting movement by a portion of the supporting means, and the portion of the supporting means providing pivoting support of the leveraging means providing a fulcrum for the leveraging means;

a four bar linkage assembly, the linkage assembly formed by the leveraging means and the supporting means, a vertical link member and a lower link member, the vertical link of the four bar linkage assembly moving in a substantially vertical path;

means for engaging a portion of the furnishing to be raised, the engaging means carried by the link moving in the substantially vertical path, the means for engaging a portion includes a member capable of engaging the furnishing to be raised, the engaging means including a bracket having a plurality of extensions for insertion into complementary openings in the furnishing member; and means for controlling the leveraging means for maintaining the engaging means in a desired position, the means for controlling the position of the leveraging means including a combination sliding member sliding relative to the leveraging means and a control arm, the sliding member and control arm providing a complementary four bar linkage in which the supporting means forms a stationary link of the linkage, and the leveraging means forms a link of the linkage.

12. A lifting apparatus as set forth in claim 11 wherein the engaging means is removable, whereby a plurality of different engaging means can be supported by the lifting apparatus for raising and lowering furnishings having a variety of complementary openings for receiving the engaging means.

13. A lifting apparatus as set forth in claim 11 wherein the supporting means provides a stationary link in each linkage arrangement.

14. A lifting apparatus as set forth in claim 11 wherein the controlling means includes a bias member for releasing and restraining the controlling means.

15. A lifting apparatus as set forth in claim 11 wherein the controlling means includes a plate member carried by the leveraging means, whereby wobble of the plate member acts to restrain the controlling means in a desired position on the leveraging means.

16. A lifting apparatus as set forth in claim 11 wherein the leveraging means includes an upper lever arm and the upper arm and the control arm both pivotally connected to the support means, the control arm pivotally connected to a portion of the sliding member of the controlling means, thereby providing the four members of the four bar linkage associated with the controlling means.

17. A method of lifting furnishings during removal and installation of floor covering, comprising the steps of:

supporting a lifting apparatus at a distance from a work area;

leveraging an item to be raised and lowered;

supporting a leveraging means for pivoting movement by a portion of a supporting means;

pivoting the leveraging means relative the supporting means;

engaging a portion of the furnishing to be raised with an engaging means;

carrying the engaging means carried by a link member of a four bar linkage;

moving the link member in the substantially vertical path;

controlling the leveraging means for maintaining the engaging means in a desired position;

sliding a sliding member along the leveraging means; and controlling the position of the leveraging means with the sliding member.

18. A method of lifting furnishings during removal and installation of floor covering as set forth in claim 17 further including the step of inserting at least one extension provided by the engaging means into complementary opening in the furnishing member.

19. A method of lifting furnishings during removal and installation of floor covering as set forth in claim 17 further including the step of removing the engaging means from the lifting apparatus for replacement with another engaging means.

20. A method of lifting furnishings during removal and installation of floor covering as set forth in claim 17 further including the step of bias a handle portion of a controlling means so as to alternately release a controlling means by squeezing the handle portion and restraining the controlling means by releasing the handle portion.

21. A method of lifting furnishings during removal and installation of floor covering as set forth in claim 17 further including the step of wobbling a plate member between a generally perpendicular position and a tilted position such that plate member when in the tilted position engages the leveraging means and prevents the sliding member from sliding along the leveraging means, the step of wobbling a plate member thereby alternatively holding and releasing a controlling means.

* * * * *